(12) United States Patent
Vieira De Morais et al.

(10) Patent No.: US 9,958,008 B2
(45) Date of Patent: May 1, 2018

(54) BEARING AND CONNECTING ROD

(71) Applicants: Mahle Metal Leve S/A, Jundiai-Sp (BR); Mahle International GmbH, Stuttgart (DE)

(72) Inventors: Paulo R. Vieira De Morais, São Bernardo do Campo (BR); Sandra Matos Cordeiro, Diadema (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 53 days.

(21) Appl. No.: 15/032,775

(22) PCT Filed: Oct. 28, 2014

(86) PCT No.: PCT/EP2014/073118
§ 371 (c)(1),
(2) Date: Apr. 28, 2016

(87) PCT Pub. No.: WO2015/063083
PCT Pub. Date: May 7, 2015

(65) Prior Publication Data
US 2016/0290397 A1 Oct. 6, 2016

(30) Foreign Application Priority Data

Oct. 29, 2013 (BR) .............................. 102013027786

(51) Int. Cl.
*F16C 33/20* (2006.01)
*B32B 15/08* (2006.01)
(Continued)

(52) U.S. Cl.
CPC .............. *F16C 33/203* (2013.01); *B32B 7/12* (2013.01); *B32B 15/08* (2013.01); *B32B 15/082* (2013.01); *B32B 15/20* (2013.01); *B32B 27/08* (2013.01); *B32B 27/20* (2013.01); *B32B 27/283* (2013.01); *B32B 27/308* (2013.01); *B32B 27/322* (2013.01); *B32B 27/36* (2013.01); *B32B 27/40* (2013.01); *B32B 2264/105* (2013.01); *B32B 2307/554* (2013.01); *F16C 2204/12* (2013.01);
(Continued)

(58) Field of Classification Search
CPC .... C23C 28/00; C23C 30/005; F04C 2240/56
See application file for complete search history.

(56) References Cited

U.S. PATENT DOCUMENTS

| | | | | |
|---|---|---|---|---|
| 5,112,683 A | * | 5/1992 | Johansen .............. | B05B 15/045 427/448 |
| 5,188,032 A | * | 2/1993 | Lewis ................... | B41C 1/1033 101/453 |
| 5,597,648 A | * | 1/1997 | Hanneman ............. | C08G 77/34 428/352 |
| 6,077,616 A | * | 6/2000 | Serafin .................... | B32B 15/08 156/245 |

(Continued)

FOREIGN PATENT DOCUMENTS

| | | |
|---|---|---|
| EP | 2592290 A1 | 5/2013 |
| GB | 2465852 A | 6/2010 |

*Primary Examiner* — Long T Tran
(74) *Attorney, Agent, or Firm* — Fishman Stewart PLLC

(57) ABSTRACT

A bearing may include a substrate and a metallic layer disposed in contact with the substrate. An adhesive layer may be disposed in contact with the metallic layer. A supporting layer may be disposed in contact with the adhesive layer. According to an example, a polymer layer may be disposed in contact with the adhesive layer. According to another example, a polymer layer may be disposed in contact with the supporting layer.

20 Claims, 1 Drawing Sheet

(51) Int. Cl.

| | | |
|---|---|---|
| *B32B 15/082* | (2006.01) | |
| *B32B 15/20* | (2006.01) | |
| *B32B 27/08* | (2006.01) | |
| *B32B 7/12* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |

(52) U.S. Cl.
 CPC ...... *F16C 2204/22* (2013.01); *F16C 2208/02* (2013.01); *F16C 2240/60* (2013.01); *F16C 2360/22* (2013.01)

(56) References Cited

U.S. PATENT DOCUMENTS

| | | | |
|---|---|---|---|
| 6,830,826 B2 * | 12/2004 | Brabant | C08J 5/06 428/364 |
| 8,530,608 B2 * | 9/2013 | McGee | B32B 7/12 528/271 |
| 2005/0018936 A1 | 1/2005 | Yoshimura et al. | |
| 2008/0159671 A1 | 7/2008 | Leonardelli | |
| 2009/0257694 A1 * | 10/2009 | Hunter | C10M 119/02 384/286 |
| 2011/0268944 A1 | 11/2011 | Adam et al. | |
| 2012/0263949 A1 * | 10/2012 | Wollack | B32B 5/022 428/355 BL |
| 2013/0040120 A1 * | 2/2013 | Chang | B32B 7/12 428/216 |

* cited by examiner

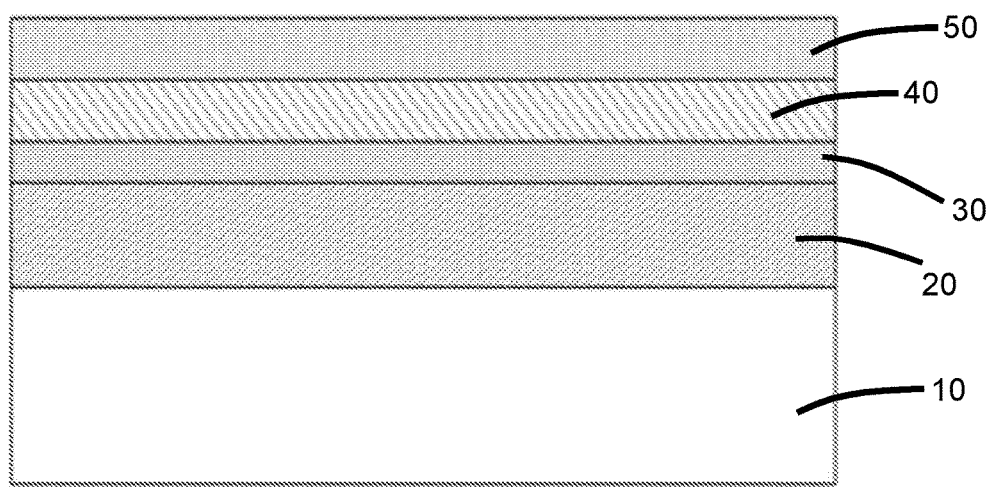

ns, both to guarantee reliability of the unit and maintain its expected useful life, today estimated at about 300000 km for petrol engines of saloon cars.

BEARING AND CONNECTING ROD

CROSS-REFERENCE TO RELATED APPLICATIONS

This application claims priority to Brazilian Patent Application No. 10 2013 027786 0, filed Oct. 29, 2013, and International Patent Application No. PCT/EP2014/073118, filed Oct. 28, 2014, the contents of which are hereby incorporated by reference in their entirety.

TECHNICAL FIELD

The invention relates generally to bearings and, more specifically, the invention relates to bearings for use in particular in high-performance internal-combustion engines.

BACKGROUND

Internal-combustion engines, such as engines that employ the familiar Otto or Diesel cycles, are used widely and commonly in vehicles intended for carrying both persons and goods, such as passenger, transport and goods vehicles, including lorries and locomotives. To summarize, these engines use a fuel with a high content of hydrocarbons, such as fossil fuels or fuels derived from renewable sources, for converting the thermal energy from burning the fuel into kinetic energy.

Today there is increasing concern for reducing emissions produced by internal-combustion engines, which are responsible for a high proportion of the production of CO2 in the atmosphere. Climate change is one of the most important environmental challenges of the present time, possibly with grave consequences. This problem is being caused by intensification of the greenhouse effect, which in its turn is related to the increase in the concentration of greenhouse gases, including carbon dioxide, in the atmosphere.

In recent years, in order to minimize the emission of gases that are harmful to the environment, such as carbon monoxide (CO), hydrocarbon gases (HC), oxides of nitrogen (NOx), as well as of particulates and/or greenhouse gases, a series of technologies has been incorporated in internal-combustion engines. The reduction in gas emissions is related, among other factors, with increase in thermal efficiency of the engine and, consequently, reduction in specific fuel consumption.

In this connection, technologies such as electronic injection, catalytic converters, and particulate filters are nowadays quite widespread and their use is almost obligatory in all internal-combustion engines. Other more recent technologies, such as direct fuel injection, common-rail technology for engines that use the Diesel cycle, and the larger-scale use of technologies that have long been known, such as mechanical compressors or turbocompressors, are also being combined with the aim of increasing energy efficiency and for meeting ever stricter emissions standards.

As a consequence, combustion engines are developing greater power per volume of piston displacement in the cylinder, usually called specific power. The efficiency of a combustion engine in the Otto cycle in the 1980s reached on average 50 HP/L, and today it may easily reach more than 100 HP/L. This means that the combustion pressure within the cylinders has increased considerably, which also means that combustion engines are operating under greater mechanical stresses, higher rotary speeds, and higher temperature. Accordingly, their components must likewise be designed for withstanding these harsher operating conditions, both to guarantee reliability of the unit and maintain its expected useful life, today estimated at about 300000 km for petrol engines of saloon cars.

In addition, there is increasing adoption of technology usually known as Start/Stop, in which the combustion engine is turned off automatically when the vehicle is not moving, and is turned on again when the driver operates the clutch or releases the brake pedal, for example. The aim of this technology is to reduce fuel consumption and consequently reduce the emission of gases when the vehicle is not in motion, for example when stopped at traffic lights or in traffic.

However, constant stopping and restarting of a combustion engine means that components are submitted to reduced lubrication more frequently, thus increasing the wear of its components.

Therefore internal-combustion engines are increasingly being subjected to harsher operating conditions, both in the sense of increases in mechanical stresses, rotary speeds and temperature, and in the sense of reduced lubrication.

In parallel, there are efforts to reduce the weight of the components of the engine and the costs associated with manufacture, relationships that must be considered when choosing the materials that will be used in its construction. Accordingly, materials technology is also an important area of development for internal-combustion engines.

One of the components that is more affected by the stresses generated by combustion engines is the connecting rod, which provides the connection between the piston and the crankshaft to transform the linear motion of the piston into rotary motion. The connecting rod is joined at one end to the piston, and at the other end it is joined to the crankshaft. In the present specification, the end of the connecting rod that is joined to the piston is called the small end, and the end of the connecting rod that is joined to the crankshaft is called the big end.

At the big end, between the connecting rod and the crankshaft, a bearing is used, made of a material of lower hardness, in order to reduce the friction between these two components. At the small end of the connecting rod, a bearing is also used, mounted between the small end and the gudgeon pin, also with the aim of reducing the friction between the components. The bearings used in the connecting rods also have the function of allowing easy assembly, compensating misalignments of assembly and accommodating particles, as is well known by a person skilled in the art. Although the example mentioned here refers to bearings mounted in connecting rods, it is certain that bearings may be used in other components of a combustion engine, such as the bearings of the crankshaft and of the camshaft etc., or in any other mechanical component that uses a bearing or requires bearings or bushes.

The bearings for applications in internal-combustion engines generally consist of a carbon steel cap coated internally with an alloy based on Pb and Sn (known as Babbitt metal or White Metal), or an alloy based on Al combined with Sn in varying concentrations, or else a copper alloy containing varying concentrations of Pb.

However, as mentioned above, the operating conditions of internal-combustion engines are becoming harsher and harsher, and bearings made of alloys based on Pb and Sn, as well as those based on Al, fail through fatigue and do not guarantee the necessary reliability and durability. In addition, there are restrictions on the use of lead as an alloying element, as it is highly toxic.

The present invention aims to overcome these drawbacks, among others.

SUMMARY

Therefore a first aim of the invention is to provide a bearing that is able to withstand high-performance operating conditions of an internal-combustion engine.

An additional aim of the present invention is to provide bearings that do not suffer fatigue during operation of a high-performance engine as well as allowing good accommodation during assembly.

Yet another aim of the invention is to provide a bearing that is able to operate with reduced lubrication in internal-combustion engines associated with an automatic system for stopping and restarting (Start/Stop).

Yet another aim of the invention is to provide a bearing with greater loading capacity (to avoid fatigue), greater wear resistance, capable of operating in conditions of reduced lubrication, free from lead, and with excellent accommodation of the distortions of the shaft.

In order to achieve the aforementioned aims, among others, the present invention relates to a bearing, intended in particular for application of an internal-combustion engine, that comprises:

a substrate;
a metallic layer in contact, on one side, with said substrate;
an adhesive layer in contact, on one side, with said metallic layer;
a supporting layer in contact, on one side, with said adhesive layer; and
a polymer layer in contact, on one side, with said adhesive layer.

According to additional and/or alternative embodiments of the present invention, the following features, alone or in technically possible combinations, may also be present:

said substrate is made of a low-carbon or medium-carbon steel;
said metallic layer is made of an aluminium alloy;
said aluminium alloy comprises from 8 to 12 wt % of Sn, from 1 to 3 wt % of Cu, from 3 to 5 wt % of Si, up to 0.7 wt % of Fe, up to 0.1 wt % of Ti, up to 0.1 wt % of Pb, the balance consisting of Al and small amounts of impurities and other elements;
said aluminium alloy comprises from 17 to 23 wt % of Sn, from 0.5 to 2 wt % of Cu, up to 0.7 wt % of Si, up to 0.3 wt % of Mn, up to 0.7 wt % of Fe, up to 0.1 wt % of Ti, up to 0.1 wt % of Pb, the balance consisting of Al and small amounts of impurities and other elements;
said aluminium alloy comprises from 5 to 8 wt % of Sn, from 0.5 to 2 wt % of Cu, from 1 to 4 wt % of Si, up to 0.3 wt % of Mn, up to 0.7 wt % of Fe, from 0.1 to 0.3 wt % of V, up to 0.1 wt % of Ti, up to 0.1 wt % of Pb, the balance consisting of Al and small amounts of impurities and other elements;
said metallic layer is made of a copper alloy;
said copper alloy comprises from 6.5 to 9.5 wt % of Sn, from 0.5 to 2 wt % of Ni, up to 5 wt % of Bi, up to 0.7 wt % of Fe, up to 0.5 wt % of P, up to 0.3 wt % of Zn, up to 0.1 wt % of Pb, with the balance consisting of Cu and small amounts of impurities and other elements;
said copper alloy comprises from 3 to 5 wt % of Sn, up to 1 wt % of Ni, up to 5 wt % of Bi, up to 0.7 wt % of Fe, up to 0.5 wt % of P, up to 0.3 wt % of Zn, up to 0.1 wt % of Pb, with the balance consisting of Cu and small amounts of impurities and other elements;
said adhesive layer is formed of an acrylic adhesive;
said adhesive layer is formed of a silicone-based adhesive and/or an elastomer adhesive;
said supporting layer is made of Al;
said supporting layer is made of an aluminium alloy that comprises up to 3 wt % of Cu, up to 2 wt % of Mn, the balance consisting of Al and small amounts of impurities and other elements;
said supporting layer is made of a polymer;
said supporting layer is made of a polymer composition that comprises at least 90% of PTFE (polytetrafluoroethylene), or PU (polyurethane), or polyester;
said polymer layer is made of a polymer comprising a metal filler;
said polymer layer is a polymer composition comprising a metal filler, and which comprises from 6 to 8 wt % of PTFE, from 2 to 4 wt % of a silane, up to 12 wt % of a pigment, from 18 to 22 wt % of Al, the balance consisting of PAI (polyamide-imide) and small amounts of impurities and other elements;
the thickness of said metallic layer is between 0.05 mm and 3 mm, in particular between 0.1 and 2.5 mm;
the thickness of said supporting layer is between 10 and 50 microns, and more particularly between 20 and 30 microns; and
the thickness of said polymer layer is between 3 and 25 microns, and more particularly between 6 and 15 microns.

The invention also relates to a connecting rod for an internal-combustion engine, the connecting rod comprising a small end in which a gudgeon pin is mounted, and a big end for mounting on a crankshaft, wherein said connecting rod comprises a bearing as defined above.

BRIEF DESCRIPTION OF THE DRAWINGS

The aims, advantages, effects, technical and functional improvements of the present invention will be better understood from reading the description of a particular embodiment thereof, presented below, referring to the appended FIGURE. This FIGURE is schematic, and its dimensions and proportions may not correspond to reality, since it only aims to describe the invention as an example and does not impose any limitations beyond those defined by the claims given below, where FIG. 1 represents a partial cross-section of a bearing according to the present invention.

DETAILED DESCRIPTION

The invention is now described in relation to particular embodiments thereof, also referring to the appended FIGURE. Specific embodiments are described in detail and are shown in the FIGURE, on the understanding that they are to be regarded as an illustration of its principles, and there is no intention to limit the invention to what is only illustrated and described in the present specification. It must be recognized that the various teachings of the embodiments discussed below may be employed separately or in any combination suitable for producing the same technical effects.

According to the present specification, the term "high performance", when associated with internal-combustion engines, must be understood as an internal-combustion engine that generates a specific power greater than or equal to 80 HP/L and/or operates at maximum revolutions greater than or equal to 6000 rpm for petrol engines and 4500 rpm for diesel engines, and/or operates at an operating temperature greater than or equal to 90° C. Equally, this high-performance internal-combustion engine may be combined with an automatic system for stopping and restarting, usually known as "Start/Stop".

Still according to the present specification, all the percentages stated herein refer to percentages by weight, unless defined otherwise.

The bearing of the present invention is intended in particular to be used for internal-combustion engines, but it may be employed in any application that requires a bearing that combines the qualities of high wear resistance and being able to withstand pressure from heavy loading. More particularly, the bearing of the invention may be used in a connecting rod of an internal-combustion engine, according to the particular embodiment described here, but it also allows varied applications in other components of an internal-combustion engine, such as in crankshaft bearings, camshaft bearings etc.

FIG. 1 illustrates schematically an embodiment of a bearing of an internal-combustion engine in a schematic partial cross-section. As mentioned above, internal-combustion engines are increasingly being subjected to harsher operating conditions and the bearings, particularly the bearings mounted in a connecting rod, are required to withstand higher loads, higher rotary speeds, higher temperatures and conditions of reduced lubrication.

According to one embodiment of the invention, the bearing comprises a substrate (10). In particular, the substrate may be made of metallic material, such as a low-carbon or medium-carbon steel.

Associated with the substrate, a metallic layer (20) is provided, which, on one side, is in contact with said substrate and, on the other side, is in contact with an adhesive layer (30), as will be seen in greater detail later on. The metallic layer has the purpose of tolerating the pressures exerted on the bearing and preventing its collapse, if the upper supporting and polymer layers wear away, besides accommodating deformations of the shaft, resisting wear, capturing contaminating particles (embeddability), supporting hydrodynamic pressures, and supplying emergency lubrication in extreme cases of operation.

The metallic layer must follow the format of the substrate and, according to a first embodiment of the invention, such a layer may be formed from an aluminium alloy that may comprise from 8 to 12 wt % of Sn, from 1 to 3 wt % of Cu, from 3 to 5 wt % of Si, up to 0.7 wt % of Fe, up to 0.1 wt % of Ti, up to 0.1 wt % of Pb, with the balance comprising Al and traces of impurities and other elements. In an alternative embodiment, the aluminium alloy of the metallic layer (20) comprises from 17 to 23 wt % of Sn, from 0.5 to 2 wt % of Cu, up to 0.7 wt % of Si, up to 0.3 wt % of Mn, up to 0.7 wt % of Fe, up to 0.1 wt % of Ti, up to 0.1 wt % of Pb, the balance consisting of Al and traces of impurities and other elements. According to another alternative embodiment of the invention, the metallic layer (20) is made of an aluminium alloy that comprises from 5 to 8 wt % of Sn, from 0.5 to 2 wt % of Cu, from 1 to 4 wt % of Si, up to 0.3 wt % of Mn, up to 0.7 wt % of Fe, from 0.1 to 0.3 wt % of V, up to 0.1 wt % of Ti, up to 0.1 wt % of Pb, the balance consisting of Al and traces of impurities and other elements. Alternatively, according to a second embodiment of the invention, the metallic layer (20) is formed from a copper alloy that may comprise from 6.5 to 9.5 wt % of Sn, from 0.5 to 2 wt % of Ni, up to 5 wt % of Bi, up to 0.7 wt % of Fe, up to 0.5 wt % of P, up to 0.3 wt % of Zn, up to 0.1 wt % of Pb, with the balance consisting of Cu and traces of impurities and other elements. According to an alternative embodiment, the copper alloy of the metallic layer (20) may comprise from 3 to 5 wt % of Sn, up to 1 wt % of Ni, up to 5 wt % of Bi, up to 0.7 wt % of Fe, up to 0.5 wt % of P, up to 0.3 wt % of Zn, up to 0.1 wt % of Pb, with the balance consisting of Cu and traces of impurities and other elements. The metallic layer may be combined with the substrate by known means, such as hot roll bonding, cold roll bonding, sintering or casting, and its thickness may vary, typically, between 5 and 60 microns (10-6 m), in particular between 10 and 50 microns. Naturally, different thicknesses may be employed, depending on the application of the bearing.

Associated with the metallic layer, an adhesive layer (30) is envisaged, for providing bonding between the metallic layer and the supporting layer. The adhesive layer may be formed from any adhesive suitable for forming a bond between the metallic layer and the supporting layer, as will be explained in greater detail later on. Adhesives that may be used in this layer include acrylic-based adhesives, or synthetic elastic adhesives or silicone-based adhesives. The adhesive layer may be applied by deposition of the adhesive or with a strip of adhesive layer, which may optionally be rolled together with the supporting layer (40). The adhesive layer has a reduced thickness, sufficient to maintain the necessary adherence between the metallic layer and the supporting layer.

Associated with the adhesive layer, the supporting layer is envisaged (40), which has the purpose of providing greater resistance to the pressure of the polymer layer (50). In this sense, the supporting layer may be made of pure metallic material, such as aluminium, or alternatively the supporting layer may be made of a metal alloy, such as an aluminium alloy, which may comprise up to 3 wt % of Cu, up to 2 wt % of Mn, the balance consisting of Al and traces of impurities and other elements. In an alternative embodiment, the supporting layer may be made of a polymer material or of a polymer composition, such as a composition that consists predominantly, i.e. at least 90%, of PTFE (polytetrafluorethylene), or PU (polyurethane), or polyester.

Above the supporting layer, and intended to come into contact with a rotating element, such as a shaft, there is the polymer layer (50). The polymer layer may be deposited and cured on the supporting layer (40), or optionally may also be envisaged as a strip that is arranged directly on the supporting layer. The polymer layer may be made of any polymer suitable for promoting a low level of friction between the rotating component and the bearing, so that the rotating component may operate with less wear, even as far as conditions of low lubrication, such as is the case, for example, of internal-combustion engines that comprise an automatic system for stopping and restarting. In particular, the polymer layer may be a polymer composition comprising 6 to 8 wt % of PTFE (polytetrafluorethylene), from 2 to 4 wt % of a silane, up to 12 wt % of a pigment, from 18 to 22 wt % of Al, the balance consisting of PAI (polyamide-imide) and traces of impurities and other elements. The thickness of the polymer layer may be between 3 and 25 microns, and more particularly between 6 and 15 microns. Naturally, this thickness may vary, depending on the application for which the bearing is intended.

The invention also relates to a connecting rod for an internal-combustion engine, the connecting rod comprising a small end on which a gudgeon pin is mounted, and a big end for mounting on a crankshaft, wherein said connecting rod comprises a bearing as defined above.

Although the invention has been described with respect to particular embodiments thereof, a person skilled in the art will be able to make changes or combinations not contemplated above, but without deviating from the teachings described here, besides expanding to other applications not considered in the present specification. Therefore, the accompanying claims must be interpreted as covering all and every equivalents that fall within the principles of the invention.

The invention claimed is:

1. A bearing, comprising:
   a substrate;
   a metallic layer in contact, on one side, with said substrate;
   an adhesive layer in contact, on one side, with said metallic layer;
   a supporting layer in contact, on one side, with said adhesive layer;
   a polymer layer in contact, on one side, with said adhesive layer; and
   wherein the adhesive layer is at least one of a deposition of adhesive between the metallic layer and the supporting layer and a strip of adhesive layer between the metallic layer and the supporting layer.

2. The bearing according to claim 1, wherein said substrate is composed of a low-carbon steel or a medium-carbon steel.

3. The bearing according to claim 1, wherein said metallic layer is composed of an aluminium alloy.

4. The bearing according to claim 3, wherein said aluminium alloy comprises from 8 to 12 wt % of Sn, from 1 to 3 wt % of Cu, from 3 to 5 wt % of Si, up to 0.7 wt % of Fe, up to 0.1 wt % of Ti, up to 0.1 wt % of Pb, and a balance of at least one of Al, impurities, and other elements.

5. The bearing according to claim 3, wherein said aluminium alloy comprises from 17 to 23 wt % of Sn, from 0.5 to 2 wt % of Cu, up to 0.7 wt % of Si, up to 0.3 wt % of Mn, up to 0.7 wt % of Fe, up to 0.1 wt % of Ti, up to 0.1 wt % of Pb, and a balance of at least one of Al, impurities, and other elements.

6. The bearing according to claim 3, wherein said aluminium alloy comprises from 5 to 8 wt % of Sn, from 0.5 to 2 wt % of Cu, from 1 to 4 wt % of Si, up to 0.3 wt % of Mn, up to 0.7 wt % of Fe, from 0.1 to 0.3 wt % of V, up to 0.1 wt % of Ti, up to 0.1 wt % of Pb, and a balance of at least one of Al, impurities, and other elements.

7. The bearing according to claim 1, wherein said metallic layer is composed of a copper alloy.

8. The bearing according to claim 7, wherein said copper alloy comprises from 6.5 to 9.5 wt % of Sn, from 0.5 to 2 wt % of Ni, up to 5 wt % of Bi, up to 0.7 wt % of Fe, up to 0.5 wt % of P, up to 0.3 wt % of Zn, up to 0.1 wt % of Pb, with a balance of at least one of Cu, impurities, and other elements.

9. The bearing according to claim 7, wherein said copper alloy comprises from 3 to 5 wt % of Sn, up to 1 wt % of Ni, up to 5 wt % of Bi, up to 0.7 wt % of Fe, up to 0.5 wt % of P, up to 0.3 wt % of Zn, up to 0.1 wt % of Pb, with a balance of at least one of Cu, impurities, and other elements.

10. The bearing according to claim 1, wherein said adhesive layer is composed of an acrylic adhesive.

11. The bearing according to claim 1, wherein said adhesive layer is composed of at least one of a silicone-based adhesive and an elastomer adhesive.

12. The bearing according to claim 1, wherein said supporting layer is composed of Al.

13. The bearing according to claim 1, wherein said supporting layer is composed of an aluminium alloy that comprises up to 3 wt % of Cu, up to 2 wt % of Mn, and a balance of at least one of Al, impurities, and other elements.

14. The bearing according to claim 1, wherein said supporting layer is composed of a polymer.

15. The bearing according to claim 1, wherein said supporting layer is composed of a polymer composition including at least 90% of at least one of polytetrafluoroethylene (PTFE), polyurethane (PU), and polyester.

16. The bearing according to claim 1, wherein said polymer layer is composed of a polymer including a metal filler.

17. The bearing according to claim 1, wherein said polymer layer is a polymer composition including a metal filler, and wherein the polymer composition further includes from 6 to 8 wt % of PTFE, from 2 to 4 wt % of a silane, up to 12 wt % of a pigment, from 18 to 22 wt % of Al, and a balance of at least one of polyamide-imide (PAI), impurities, and other elements.

18. A connecting rod, comprising: a first end for mounting a gudgeon pin, a second end for mounting on a crankshaft, and a bearing disposed on at least one of the first end and the second end, wherein the bearing includes:
   a substrate;
   a metallic layer overlaying and in contact with the substrate;
   an adhesive layer overlaying and in contact with the metallic layer;
   a supporting layer overlaying and in contact with the adhesive layer;
   a polymer layer overlaying and in contact with the supporting layer; and
   wherein the adhesive layer is at least one of a deposition of adhesive between the metallic layer and the supporting layer and a strip of adhesive layer between the metallic layer and the supporting layer.

19. A bearing, comprising:
   a substrate;
   a metallic layer overlaying and in contact with the substrate, wherein the metallic layer has a composition including at least one of an aluminium alloy and a copper alloy;
   an adhesive layer overlaying and in contact with the metallic layer;
   a supporting layer overlaying and in contact with the adhesive layer;
   a polymer layer overlaying and in contact with the supporting layer, wherein the polymer layer is composed of a polymer including a metal filler; and
   wherein the adhesive layer is at least one of a deposition of adhesive between the metallic layer and the supporting layer and a strip of adhesive layer between the metallic layer and the supporting layer.

20. The bearing according to claim 19, wherein the supporting layer is composed of at least one of a metal and a polymer.

* * * * *